(12) United States Patent
Graf et al.

(10) Patent No.: US 12,000,734 B2
(45) Date of Patent: Jun. 4, 2024

(54) OPTICAL SYSTEM FOR SPECTROMETERS

(71) Applicant: HITACHI HIGH-TECH ANALYTICAL SCIENCE GMBH, Uedem (DE)

(72) Inventors: Heinz Jürgen Graf, Kalkar (DE); Rainer Simons, Kranenburg (DE)

(73) Assignee: HITACHI HIGH-TECH ANALYTICAL SCIENCE GMBH, Uedem (DE)

( * ) Notice: Subject to any disclaimer, the term of this patent is extended or adjusted under 35 U.S.C. 154(b) by 230 days.

(21) Appl. No.: 17/774,851

(22) PCT Filed: Nov. 6, 2020

(86) PCT No.: PCT/EP2020/081343
§ 371 (c)(1),
(2) Date: May 5, 2022

(87) PCT Pub. No.: WO2021/089817
PCT Pub. Date: May 14, 2021

(65) Prior Publication Data
US 2022/0397455 A1 Dec. 15, 2022

(30) Foreign Application Priority Data
Nov. 7, 2019 (EP) ..................................... 19207778

(51) Int. Cl.
*G01J 3/02* (2006.01)
*G01J 3/20* (2006.01)

(52) U.S. Cl.
CPC ............. *G01J 3/0208* (2013.01); *G01J 3/021* (2013.01); *G01J 3/20* (2013.01)

(58) Field of Classification Search
CPC .. G01J 3/021; G01J 3/0208; G01J 3/02; G01J 3/18; G01J 3/0291; G01J 3/10; G01J 3/36;
(Continued)

(56) References Cited

U.S. PATENT DOCUMENTS 2,922,331 A * 1/1960 Fastie ....................... G01J 3/18
356/331
2017/0322077 A1* 11/2017 Bohle ....................... G01J 3/20

FOREIGN PATENT DOCUMENTS

DE 19961481 B4 * 8/2006 ................ G01J 3/02
DE 10 2007 027 008 A1 12/2008
(Continued)

OTHER PUBLICATIONS

International Search Report and Written Opinion issued in connection with PCT Patent Application No. PCT/ EP2020/081343 dated Feb. 18, 2021.

*Primary Examiner* — Michael P Stafira
(74) *Attorney, Agent, or Firm* — TAROLLI, SUNDHEIM, COVELL & TUMMINO L.L.P.

(57) ABSTRACT

Spectrometer device (100) with entrance aperture (2), diffraction grating (3), two detectors (5a, 5b) to spectrally measuring the incoming light (L), the detectors being located on the same side of the dispersion plane. Two vertically focusing mirrors (4, 4a, 4b) focus the light onto detectors, the minors being arranged as front row mirrors (4b) and back row minors (4a) along two polygon graphs (6a, 6b) offset to each other and to the focal curve. The angles of deflection (cp, $_{91}$) for the front row mirrors are <90°, allowing to minimize the offset (dl) of the front row minors (4b) to the focal curve. The distances (d) between the front row minors and corresponding detectors (5b) is minimized while still avoiding collisions between the detectors (5b) and their mounts with back row detectors (5a) and their (Continued)

mounts. The front row mirror elements are overlapping the adjacent back row mirror element.

12 Claims, 7 Drawing Sheets

(58) Field of Classification Search
CPC .......... G01J 3/0218; G01J 3/42; G01J 3/0256;
G01J 3/2823; G01J 3/453; G01J 3/28;
G01J 3/2803; G01J 3/0264; G01J 3/0205;
G01J 9/0215; G01J 3/06; G01J 3/08;
G01J 3/027; G01J 3/0232; G01J 3/0286;
G01J 9/02; G01J 3/26; G01J 3/4531;
G01J 9/00; G01J 3/14; G01J 3/1804;
G01J 3/20; G01J 3/22; G01J 3/45; G01J
3/0237; G01J 2003/102; G01J 3/108;
G01J 1/4257; G01J 3/0229; G01J 3/4338;
G01J 2003/423; G01J 3/0272; G01J 3/04;
G01J 3/24; G01J 3/0202; G01J 3/1809;
G01J 3/024; G01J 3/0259; G01J 3/447;
G01J 3/0224; G01J 3/32; G01J 3/4406;
G01J 2003/1842; G01J 3/0243; G01J
2003/2866; G01J 3/1895; G01J 3/44;
G01J 1/0411; G01J 2003/064; G01J
2003/1213; G01J 2003/2826; G01J
3/0262; G01J 3/12; G01J 3/443; G01J
2003/106; G01J 2003/1847; G01J 3/0235;
G01J 3/433; G01J 3/457; G01J 5/0018;
G01J 5/0801; G01J 5/60; G01J 1/0414;
G01J 1/32; G01J 1/429; G01J 2003/1295;
G01J 2003/1828; G01J 2003/262; G01J
3/0221; G01J 3/0275; G01J 2003/104;
G01J 2003/1819; G01J 3/00; G01J
3/0248; G01J 3/0294; G01J 9/0246; G01J
1/0238; G01J 2003/063; G01J 2003/123;
G01J 2003/1866; G01J 2003/1876; G01J
2003/2813; G01J 2003/2833; G01J
2003/2876; G01J 2003/326; G01J
2009/0249; G01J 3/0254; G01J 3/0289;
G01J 3/1256; G01J 3/1838; G01J 3/2889;
G01J 3/4532; G01J 3/46; G01J 3/465;
G01J 3/513

See application file for complete search history.

(56) References Cited

FOREIGN PATENT DOCUMENTS

| DE | 198 53 754 B4 | | 6/2009 | |
|---|---|---|---|---|
| DE | 19861479 B4 | * | 2/2016 | ............... G01J 3/20 |
| DE | 102016005386 A1 | * | 11/2017 | ............. G01J 3/021 |
| FR | 2953017 B1 | | 5/2012 | |
| KR | 20110017272 A | * | 2/2011 | |
| WO | WO-2016040603 A1 | * | 3/2016 | ............ G01J 3/0218 |

* cited by examiner

OPTICAL SYSTEM FOR SPECTROMETERS

RELATED APPLICATIONS

The present invention is a U.S. National Stage under 35 USC 371 patent application, claiming priority to Serial No. PCT/EP2020/081343, filed on Nov. 6, 2020, which claims priority from European Patent Application No. 19207778.2 filed on Nov. 7, 2019; the entireties of both are hereby incorporated herein by reference.

SUBJECT OF THE INVENTION

The invention relates to an optical system for spectrometers and to a spectrometer device comprising such an optical system.

BACKGROUND OF THE INVENTION

An optical system for spectrometers is a component used to measure properties of light over a specific portion of the electromagnetic spectrum. It is part of a spectrometer device which is used to generate spectral lines by means of arc or spark excitation, LIBS, ICP or glow discharge excitation and the like. The wavelengths and intensities of these spectral lines are measured to identify materials or analyze their chemical composition. Such spectrometer devices may operate over a wide range of wavelengths, from deep UV into far infrared.

A spectrometer device requires an excitation generator for the spectral analysis of a sample, which provides the excitation energy required for the evaporation and ionization of parts of the sample generating a plasma, an optical system which separates the wavelengths of the spectral lines emitted by that plasma, a detector or detector arrangement with which the intensity of those spectral lines can be measured, a readout and control system to record the measured values and control the functions of the spectrometer device, and a computer with software for convenient conversion of the measured values obtained into contents for the individual components of the sample. Modern spectrometers almost exclusively use diffraction gratings for spectral dispersion. If the grating surface is non-planar, those gratings have imaging capabilities. Shape and spacing of the grating grooves affect these imaging properties. When an optical system is set up in a so called Paschen-Runge mount or setup, the grating is a Rowland grating whose substrate is a concave sphere with the radius of curvature R. Groove shape and spacing are such that the resulting focal curve (=curve in the plane of dispersion of the grating where sharp images of the entrance aperture occur) is a circle of the diameter R called Rowland circle. All components of the optical system like grating, entrance aperture and detector(s) are located on the Rowland circle. The radius from the grating's center of curvature to the center of symmetry of the groove pattern on the surface of the grating (which ideally coincides with the geometrical center of the grating) is called the grating normal line. It is the line of reference for the grating equation against which all angles are measured. In a Paschen-Runge mount, the focal curve (being a circle) is symmetrical around that normal line. Grating substrates may be non-spherical and groove spacings and shapes may differ from the Rowland type, resulting in non-circular focal curves that may be non-symmetrical around the normal line. This can be the case with so-called flat-field gratings which have focal curves optimized for the use of spatially resolving, linear (array) detectors under certain angles of diffraction. The invention can be applied to some of those systems as well and is not restricted to the Paschen-Runge mount alone.

Optical systems using line detectors, such as CCD-sensors or CMOS-sensors, having pixel heights <1 mm will benefit from vertically focusing elements, e. g. rod lenses, cylindrical lenses, cylindrical mirrors or aspherical mirrors or lenses, to compress the spectral lines to be detected from a height of sometimes several millimeters perpendicular to the plane of dispersion to ideally the pixel height of the detector used. Otherwise signals from weak lines might go undetected due to poor (light-) intensity levels. This is especially true for optical systems of large focal length. Such purely vertical focusing must happen at the detector and cannot be done collectively e.g. at the entrance slit due to the imaging properties of the grating. It is often beneficial to combine vertical light focusing and deflection out of the plane of dispersion to decrease the overall size of an optical system and create the necessary mounting space for the detectors.

Over the years, several solutions to the problem of vertical focusing at the detector and deflection out of the plane of dispersion have been described and the state of the art is covered by several patents:

In DE 198 53 754 B4 and U.S. Pat. No. 6,614,528 B1 vertical focusing and deflection out of the plane of dispersion is carried out by cylindrical mirrors. The longitudinal axes of those mirrors are mounted in the plane of dispersion along one polygon graph, each section of which is parallel and offset to their dedicated local tangent to the actual focal curve of the optical system. Here the radii of curvature $\rho_{Cyl}$ are equal for all cylindrical mirrors. The offset or distance d between local tangent and corresponding section of the polygon graph is constant over the entire wavelength range or focal curve and determined by the universally valid equation $$d = \frac{1}{2}\rho_{Cyl}\cos\frac{\varphi}{2}. \tag{1}$$

where $\varphi$ is the angle of deflection out of the plane of dispersion. To prevent damage of the mirror edges during the assembly of the detector units (each consisting here of a vertically focusing cylindrical mirror element, an assigned detector and a mounting plate or base plate), a gap between adjacent mirrors is necessary. To create the necessary space within the optical system for the detectors themselves, whose housings extend further than their light sensitive or receptive areas, standardized angles of deflection out of the plane of dispersion of $\varphi=\pm 90°$ were chosen for the cylindrical mirrors, so that the detectors become located on two planes parallel and equidistant (distance=d) to the plane of dispersion. Thereby one of those mounting planes is arranged above the plane of dispersion, whereas the other one is arranged below the plane of dispersion. The lengths of the cylindrical mirrors are adapted to the lengths of the receptive areas of the assigned detectors used. Generally, the lengths of the mirrors will underrun the lengths of the receptive areas of the assigned detectors slightly to keep placement tolerances. Due to increasing viewing angle, mirror shapes must become increasingly trapezoidal with increasing angle of diffraction to ensure that incident spectral lines fall entirely onto the mirror surface (or into the gaps between adjacent mirrors). Also, mirror center points and detector center points become more offset relative to each other along their section of the polygon graph with increasing angle of diffraction. Since a spectral line is not yet focused at a position remote from the focal curve, spectral lines incident on the cylindrical mirror surface will extend horizontally over an area, which is much broader than their expected FWHM on the illuminated area of the detector. The width of this area on the mirror surface will depend on the distance d between the longitudinal axis of the cylindrical mirror and the corresponding local tangent to the focal curve calculated according to equation (1). At the edge of a mirror, the light of a spectral line will hit that mirror only partly so only a fraction of it will reach the assigned detector. Therefore, its intensity will change in case a spatial drift occurs. Such lines must therefore be considered unreliable and should not be used for spectral evaluation of a sample. Thus, in this system spectral lines that are falling partly or completely into the gaps between mirrors are lost.

In FR2953017B1 two rows of cylindrical mirrors having different radii of curvature $\rho_{Cyl1}$ and $\rho_{Cyl2}$ are used for vertical focusing and deflection out of the plane of dispersion. The two rows are offset to each other and to the focal curve according to equation (1) and one standardized angle of deflection of $\varphi=90°$ out of the plane of dispersion is chosen. As depicted in said patent specification, the center points of those cylindrical mirrors belonging to one row can be regarded as located along a so called folium curve. This is, however, simply the result of the fact that their longitudinal axes are still mounted in the plane of dispersion along their respective polygon graph as described in the preceding paragraph. That means that in this setup each row of cylindrical mirrors is mounted in exactly the same way as in DE 198 53 754 B4 and US 6,614,528 B1 except that deflection is happening in one direction only. The mirror edges can't collide in this setup because mirrors covering adjacent parts of the spectrum are situated in different rows. In order to also ensure a collision-free setup in the "third dimension" of the optical system (i.e. the direction of deflection) the radii of curvature are chosen in such a way, that the mounting plane of the assigned detectors for the front row mirrors (i.e. mirrors in the row closer to the grating) is located well above the mounting plane of the assigned detectors for the back row mirrors. The radii of curvature chosen to avoid both collisions between mirror edges as well as detector mounts in this example are 27.5 mm and 75 mm. Since mirrors from both rows 1 and 2 are displaced from the focal curve by the distances $d_1$ and $d_2$ respectively, spectral lines again aren't focused at the surfaces of those cylindrical mirrors. Therefore, around the edge of a front row mirror in an area of a certain width, spectral lines may fall partly on one and partly on the other mirror and therefore will be detected by two detectors simultaneously or they fall into a gap between adjacent mirror edges and therefore won't be detected at all. The width of this area—the transition zone—is again dependent on the distances $d_i$ to the focal curve of the cylindrical mirrors involved. Particularly, the larger the radius of curvature of the front row mirrors (here 75 mm) is, the wider the transition zones will be. Spectral lines falling into this zone might also be compromised in their view of the plasma if the optical system is operated in direct view of the plasma. Using the combined signal of a line from adjacent detectors if applicable might be problematic due to variations in the properties of the detectors. Therefore, spectral lines falling into a transition zone must be considered as lost.

The use of aspherical (off axis parabolic) mirrors as described in DE102007027010A1 and U.S. Pat. No. 8,649,009B2 as another example for deflection and vertical focusing doesn't solve the problem of the gaps of DE19853754B4, it just improves vertical focusing.

The state of the art is also reflected in several spectrometers employing no or only limited vertical focusing and no deflection or only partly carried out deflection out of the plane of dispersion: An almost gap-free wavelength coverage can be achieved by using an alternating setup of a) flat mirrors deflecting light out of the plane of dispersion with an angle of deflection of $|\varphi|=90°$ to their assigned detectors and b) direct light detector units (i.e. detectors without any mirrors), with a and b being arranged along 2 rows and with the mirror edges overlapping the receptive areas of adjacent direct light detectors (in the line of sight seen from the grating center). The widths of the transition zones here depend solely on the location of the deflecting mirrors relative to the focal curve as the direct light detectors are located on the focal curve itself. Vertical focusing at isolated locations can be achieved by replacing a flat mirror with a matching cylindrical one or by fixing e.g. cylindrical lenses or rod lenses having the appropriate imaging properties to the detector itself and correcting its position relative to the focal curve appropriately. The imaging properties of cylindrical lenses or rod lenses however are inferior to the imaging properties of cylindrical mirrors or aspherical mirrors. Another way to achieve gap-free coverage is realized by alternately mounting the detectors slightly above and slightly below the plane of dispersion tangentially to the focal curve, provided that the uncompressed spectral lines are sufficiently high (=extended in vertical direction) and by again letting the receptive areas of the detectors overlap. This setup can be combined with off-plane vertical focusing, e.g. by applying cylindrical lenses to the detectors. However, in off-plane areas the amount of light declines and view of the plasma might be compromised. The setup can also be combined with means of collecting light from areas which are closer to the plane of dispersion than the receptive areas of the detectors, e. g. by a window with inclined edges in front of the detector working as a periscope. In any of these setups, the overlap zone will allow to choose on which detector to measure the line in question. Again, the combination of the signal of one spectral line from two detectors is not advised due to potentially different detector properties and view of plasma issues in case the optical system is looking directly into the plasma.

However, it would be desirable to detect the spectrum quasi-continuously over the entire available wavelength range of the optical system with minimized widths of the transition zones and to have the option of in plane vertical focusing at the same time.

SUMMARY OF THE INVENTION

It is an object of the invention to provide an optical system that enables a quasi-continuous detection of the spectrum in a desired wavelength range by minimizing the extent of the transition zones between adjacent, overlapping and potentially vertically focusing mirror elements. It is another object of the invention to reduce the overall size (height) of the optical system.

The objects are solved by an optical system with the features of the independent claim 1. Advantageous further embodiments of the optical system result from the dependent claims 2 to 11. Furthermore, the object is solved by a spectrometer according to claim 12.

The invented optical system comprises at least one entrance aperture for entering light to be analyzed into the optical system, at least one diffraction grating for spectral dispersion of that light, at least two vertically focusing mirror element for focusing the diffracted light as well as deflecting it out of the plane of dispersion and at least two detectors to measure the spectrum of the diffracted light, wherein each light focusing mirror element is assigned to one detector. Here the detectors are arranged on the same side of a plane of dispersion of the optical system to reduce the height of the optical system. The vertically focusing mirror elements are arranged as front row mirror elements and back row mirror elements along two polygon graphs offset to each other and to the focal curve, where each section of the polygon graph is parallel to its dedicated local tangent to the focal curve of the grating. In order to provide an optical system that enables a quasi-continuous detection of the spectrum in a desired wavelength range by minimizing the extent of the transition zones between adjacent, overlapping and potentially vertically focusing mirror elements, the offset of the mirror axis of the front row mirror elements to the focal curve is minimized. This is done by choosing an angle of deflection of $|\varphi|<90°$ for the vertically focusing mirror elements arranged as front row mirror elements in order to fold away their assigned detectors and their mounts from the potentially colliding back row detectors and their mounts.

It is particularly advantageous if the lengths of the mirror elements underrun the lengths of the receptive areas of their assigned detectors and adjacent ends of the mirror elements overlap each other or overlap the receptive areas of adjacent detectors that have no mirror element assigned to them. That way, the receptive areas of the adjacent detectors as well as their illuminated areas will overlap, too. Furthermore, it is very advantageous if the width of the transition zones is minimized by offsetting the focusing mirror elements as little as possible from each other and from the focal curve by minimizing the maximum occurring distance $d_1$ between detector and mirror element. This is achieved by choosing an angle of deflection of $|\varphi|<90°$ for the front row mirror elements. As a result, their assigned detectors and their mounts can be folded away from the potentially colliding back row detectors and their mounts. This is in contrast to FR2953017B1 where only $\rho_{Cyl}$ is increased to create the necessary mounting space for the assigned detectors. Minimizing the maximum occurring distance will also decrease the total height of the optical system, which is the second object of the invention. Furthermore, by choosing an angle of deflection of $|\varphi|<90°$ for the front row mirror elements, the distance to the focal curve can be reduced for the front row mirror elements compared to the state of the art optical system with detectors arranged only on one side of the dispersion plane. The reduced distance to the focal curve reduces the out-of-focus line area on the front row mirror element in the inventive optical system reducing the widths of the transition zones.

Figure 5:
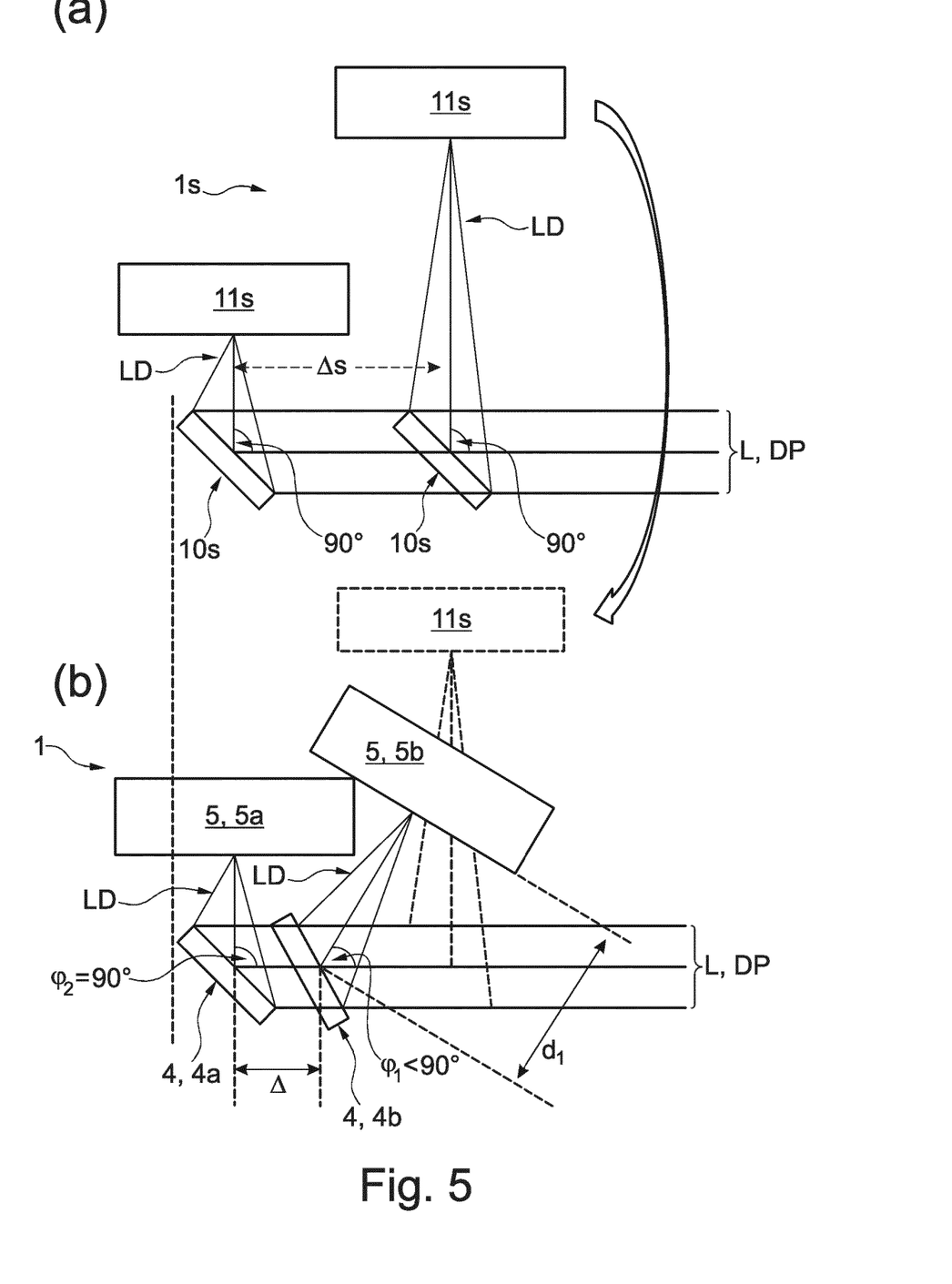
FIG. 5 out of plane deflection and mirror-detector-setup in the different approaches for spatial arrangements of mirror-detector-setups (a) according to the state of the art, and (b) according to the present invention.

To minimize the maximum occurring distance $d_1$ between detector and mirror element we must estimate the resulting widths of the transition zones of the 2 different, exemplary spatial arrangements of vertically focussing mirrors and assigned detectors in a Paschen-Runge type spectrometer as described above and show the most favourable setup, see also FIG. 5.

Figure 1:
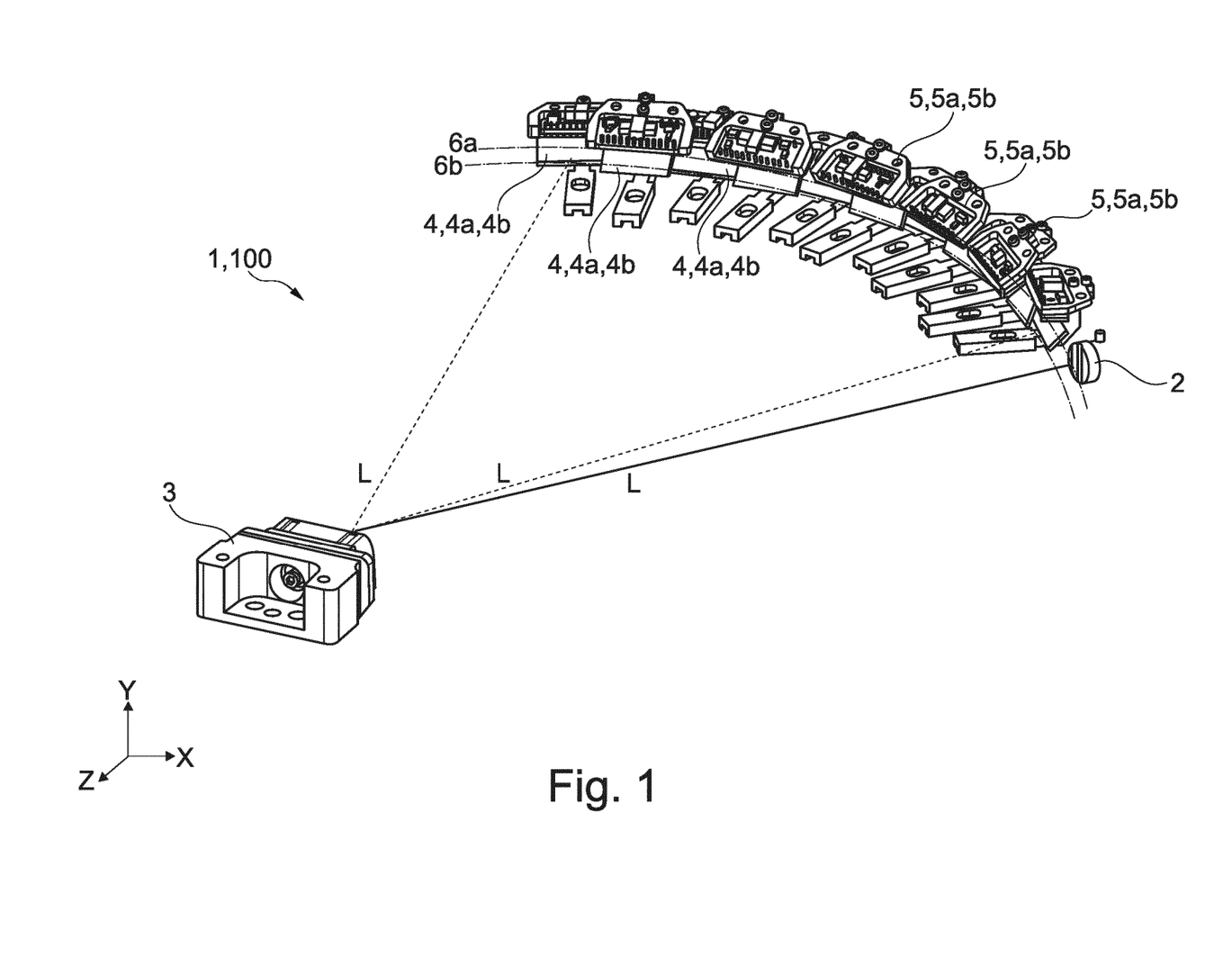
FIG. 1: schematic view of a first embodiment of the optical system according to the present invention when measuring the diffracted light form an isometric view.

In a preferred embodiment where two or more detectors are equipped with mirror elements, which are adjacent to each other, the mirror elements must have different distances to the focal curve in order to enable overlapping. The front row will feature an angle of deflection of $|\varphi|<90°$ and depending on the shape of the detector mount the back row has the same angle of deflection or a larger one as shown in FIG. 1.

It is very advantageous if the curved surfaces of the adjacent vertically focusing mirror elements have unequal radii of curvature as well as unequal angles of deflection. Thereby the distances between vertically focusing mirror elements and assigned detectors and the overall size of the system can be optimized.

In another preferred embodiment where the optical system comprises a detector arrangement covering a continuous wavelength range it is particularly beneficial if at least every second detector of the detector arrangement is equipped with a mirror element and if each mirror element overlaps with any adjacent mirror or with the receptive area of any adjacent direct light detector, respectively. That way, the receptive areas of the detectors as well as their illuminated areas will overlap. By choosing an angle of deflection of $|\varphi|<90°$ for the (front row) mirror elements, their assigned detectors and their mounts can be folded away from the potentially colliding (back row) direct light detectors to create the necessary mounting space for the assigned detectors. The front row can therefore be brought nearer to the direct light detectors as detector mounts won't collide.

In a further preferred embodiment, the shape of the reflecting surface of at least one of said mirrors is a segment of a cone, i. e. the surface has a variable radius of curvature, which is increasing along the mirror axis, in order to enable overlapping.

In a further preferred embodiment, the shape of the reflecting surface of at least one of said mirrors is a cylinder, e.g. the surface has a constant radius of curvature along the mirror axis.

In another embodiment, the light focusing elements are cylindrical mirrors and/or conical mirrors. Additionally or alternatively, the vertically focusing elements are focusing lenses, such as e.g. rod lenses or cylindrical lenses combined with flat deflecting mirror elements. The selection of vertically focusing elements can be made depending on the required task, resolution, the grating used or size of the optical system. Especially a combination of different vertically focusing elements increases the flexibility of the optical system. Furthermore, it is possible to construct the vertically focusing element or optical system to be able to exchange the vertically focusing element to generate a flexible and upgradable optical system.

In another embodiment, at least one detector is equipped with a lens for vertical focusing, e.g. a rod lens or a cylinder lens.

In another embodiment, the building principle of the optical system is a Paschen-Runge-setup or a flat-field-setup or a Czerny-Turner-setup or an Ebert-Fastie-Setup.

In a very beneficial embodiment, the detectors of the detector arrangement are line-detectors, preferably CCD or CMOS detectors.

A spectrometer device according to the invention comprises at least one optical system according to one of the preceding claims, further comprising an operating unit connected at least to the detector arrangement to operate the detector arrangement and to analyze the measured spectrum of the diffracted light.

The above listed embodiments can be used individually or in any combination to provide the device and process according to the invention.

BRIEF DESCRIPTION OF THE DRAWINGS

These and other aspects of the invention are shown in detail in the illustrations as follows.

DETAILED DESCRIPTION OF EMBODIMENTS

FIG. 1 shows a general arrangement of the optical system 1 in a Paschen-Runge-setup comprising the entrance aperture 2, through which the light L to be analyzed is entering in the optical system 1, the grating 3 for spectral dispersion of the light L, the vertically focusing mirror elements 4 for focusing the light L and the detectors 5 to measure the spectrum of the light L. In order to focus the dispersed light, the vertically focusing mirror elements 4 are arranged along two polygon graphs 6a, 6b offset to each other and to the focal curve. Each section of a polygon graph is parallel to its dedicated local tangent to the focal curve of the grating 3, which then is measurable by the detectors 5 to which each vertically focusing element 4 is assigned. Since the vertically focusing mirror elements are arranged along the polygon graphs 6a, 6b, the detectors 5 or their medians and the focal curve can superimpose each other. It is particularly important in this optical system that the adjacent ends 7a, 7b of the vertically focusing elements 4 are overlapping and that the maximum distance d calculated according to equation (1) between vertically focusing mirror element and detector is minimized. By choosing an angle of deflection of $|\varphi|<90°$, in this example 60°, for the front row mirror elements an almost gap-free measurement of the covered wavelength range can be assured.

Figure 2:
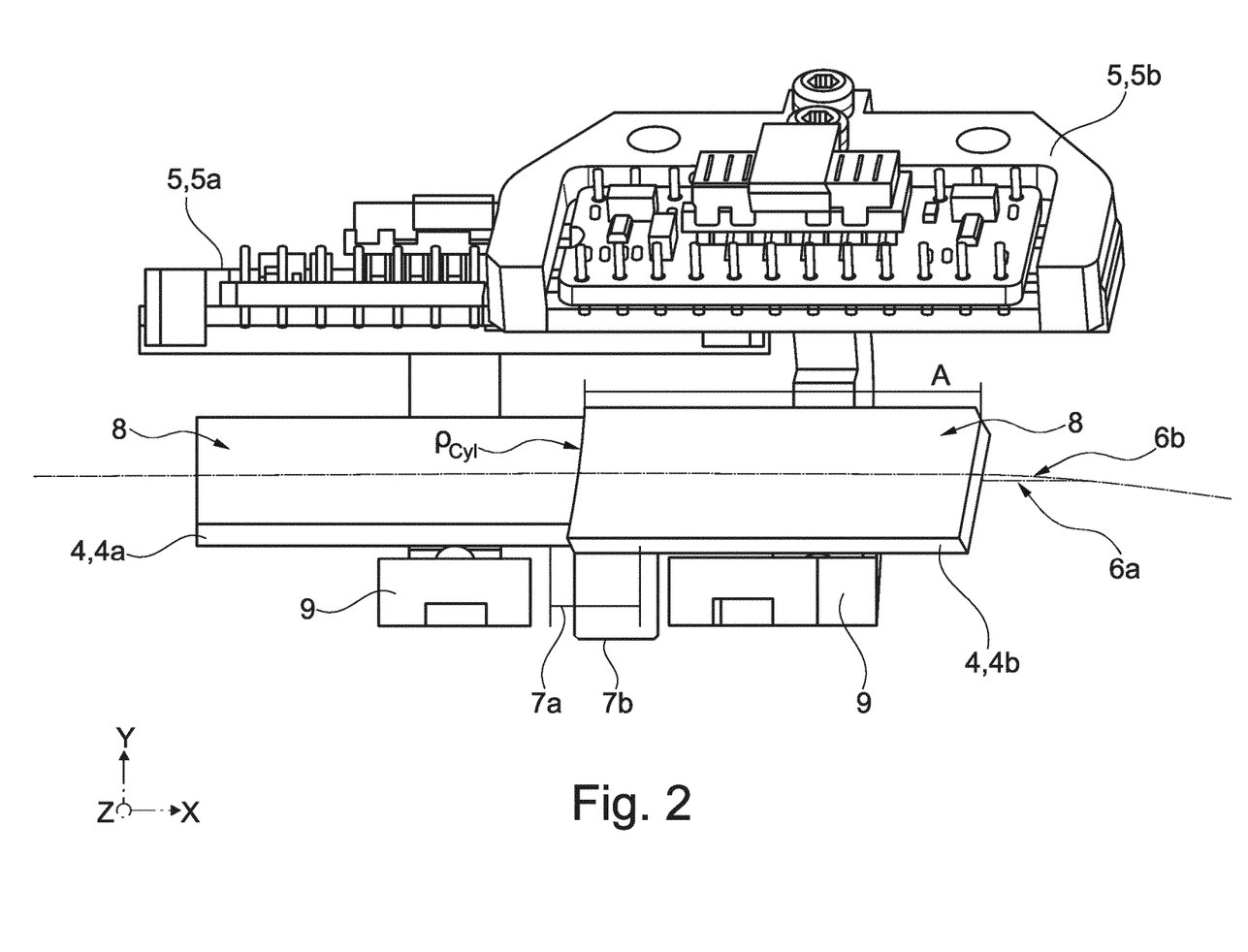
FIG. 2 schematic and detailed view of the vertically focusing elements and detectors in a first embodiment of the optical system in front view.
Figure 4:
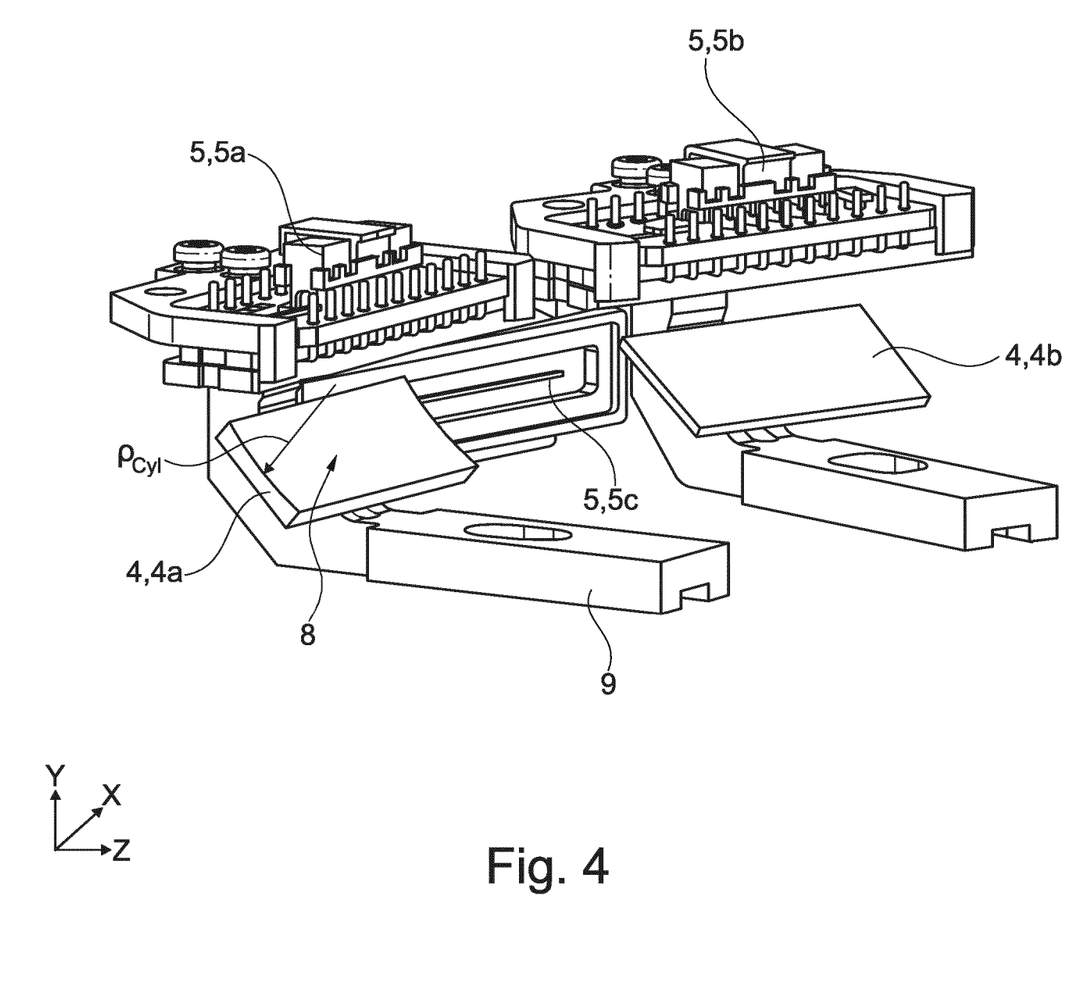
FIG. 4 schematic and detailed view the vertically focusing elements and detectors in a third embodiment of the optical system in an isometric view.

FIG. 2 shows the detail of the arrangement of vertically focusing mirror elements 4 and detectors 5 as used in the embodiment shown in FIG. 1. The vertically focusing mirror elements 4 of the embodiments of FIG. 1 and FIG. 4 are arranged along two polygon graphs 6a, 6b offset to each other and to the focal curve. In the perspective of FIG. 2, the two polygon graphs 6a, 6b fall on each other, which is why only one polygon graph is visible. Each section of a polygon graph is parallel to its dedicated local tangent to the focal curve of the grating 3. In this embodiment, the vertically focusing mirror element 4a is assigned to the detector 5a, and the vertically focusing mirror element 4b is assigned to the detector 5b. For an easier handling of these elements, each detector 5a and vertically focusing mirror element 4a are mounted on a base plate 9. This also applies to the detector 5b with its respective vertically focusing mirror element 4b. The vertically focusing mirror elements 4a, 4b are arranged within distances d(4a) and d(4b) calculated according to equation (1) to the focal curve and the medians of the detectors 5a and 5b are superimposing the focal curve.

In general, the angle of deflection $\varphi$ can be less than or equal to 90°. Here the angles of deflection $\varphi$ of the adjacent vertically focusing elements are unequal and have values of 90° for the mirror element 4a and 60° for the mirror element 4b. A further influence on vertical focusing is done by the curved surface 8 of the mirror elements 4a, 4b. The curved surface 8 has one radius of curvature $\rho(4a)=27.5$ mm for mirror element 4a which is a cylindrical surface and another radius of curvature $\rho(4b)=35$ mm for mirror element 4b which is also a cylindrical surface. This embodiment allows for overlapping adjacent ends of vertically focusing mirror elements while minimizing d(4b). This embodiment also allows an easy exchange of vertically focusing elements 4, such that the mirror elements can easily be exchanged by flat mirror elements to dampen focusing thus decreasing intensity levels when needed. Further, it would also be feasible to replace a focusing mirror element with a combination of a flat deflection mirror element and a focusing lens.

Figure 3:
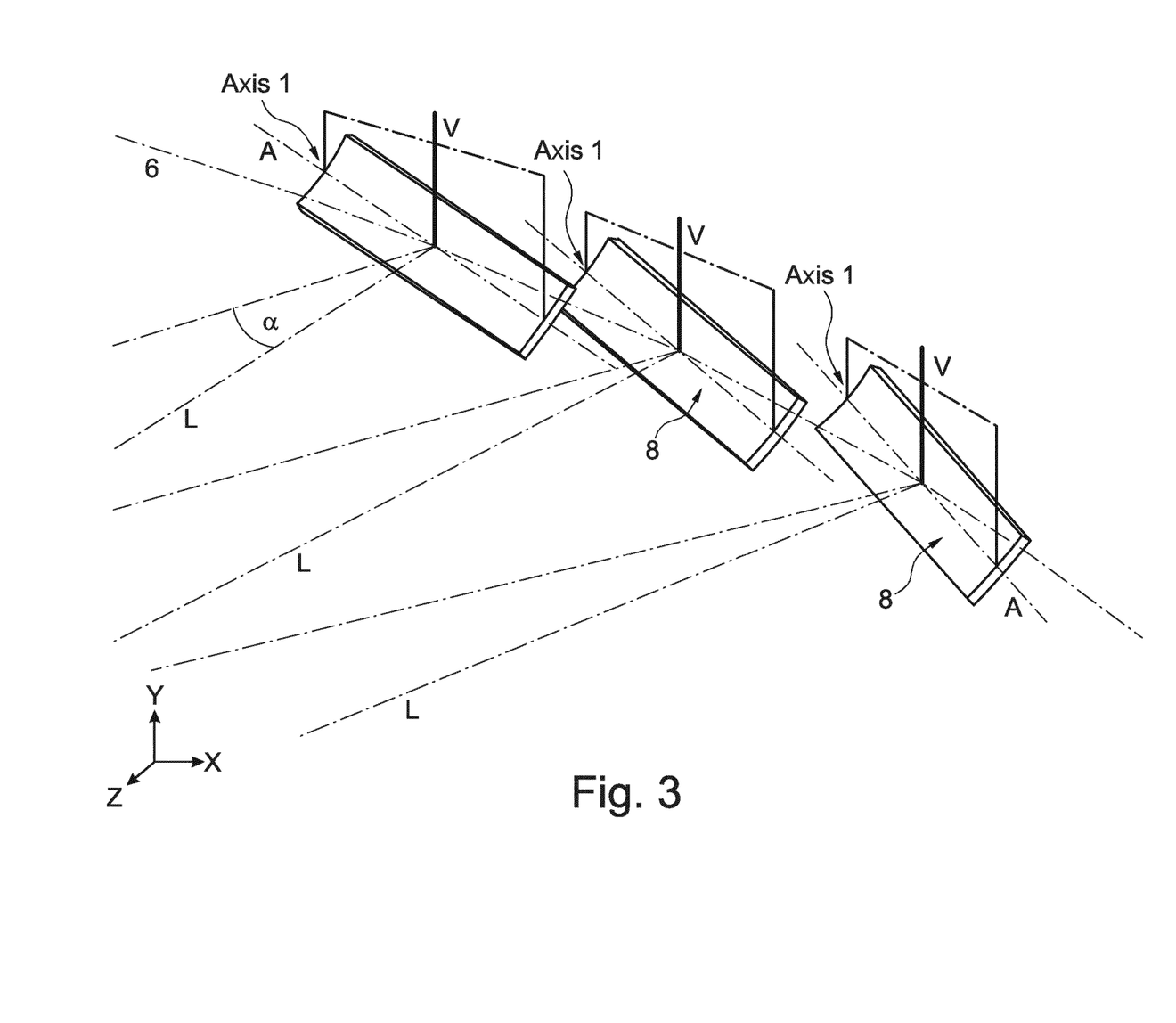
FIG. 3 schematic and detailed view of the vertically focusing elements in a second embodiment of the optical system in an isometric view.

In a second embodiment, shown in FIG. 3, the vertically focusing mirror elements are conical mirrors. The longitudinal axis A of each of the vertically focusing mirror elements 4 is intersecting the polygon graph 6 each section of which is parallel to their dedicated local tangent to the focal curve. The distance between the polygon graph sections and the local tangents is given by equation (1) where $\rho_{Cyl}$ must be substituted with $\rho_{Avg}$, the average radius of curvature of the focusing conical mirror element featured in this embodiment. Adjacent vertically focusing conical mirror elements 4 have equal angles of deflection, in this case 90°. Since the radii of curvature of the conical mirror elements are different at each point along its longitudinal axis, equation (1) will provide different distances d for each point along the mirror element's longitudinal axis from the focal curve. Therefore, the longitudinal axis of the mirror element is intersecting the polygon graph and the axis cannot be on the graph itself. Since the radius of curvature on one end of the conical mirror element is smaller than on the opposing end, the corresponding distances are different and therefore adjacent and identical conical mirror elements can overlap like shingles of a roof providing quasi-continuous coverage of the wavelength range with minimized widths of the transition zones between adjacent conical mirror elements. The tangential focus of the wavelength of the spectral line falling on a particular spot of the conical mirror element is of course again unaffected by the deflection out of the plane of dispersion or the vertical focusing in the direction perpendicular to the plane of dispersion. Therefore, the detector cannot be parallel to the plane of dispersion like in other embodiments but must be tilted around the point where the beam from $\rho_{Avg}$ hits it, staying in plane with the longitudinal axis of the conical mirror element at the same time. Through appropriate tilting, a correct tangential focus for every wavelength hitting each spot along the conical mirror's longitudinal axis is achieved. It is also possible to use adjacent conical mirror elements having different $\rho_{Avg}$ and/or different angles of deflection $\varphi$.

The third embodiment in FIG. 4 has a larger number of detectors 5 than vertically focusing mirror elements 4. It is necessary that each vertically focusing mirror element 4 is assigned to a detector 5, but in order to detect the light it is not necessary that each detector 5 has an assigned vertically focusing mirror element 4. These direct imaging detectors 5c that do not have an assigned vertically focusing mirror element 4 are arranged directly along a segment of the focal curve of the grating 3. Anyhow, these direct imaging detectors 5c must be considered as an adjacent vertically focusing element 4 alike, such that the adjacent ends 7a, 7b of the direct imaging detector 5c is overlapped by the adjacent ends of the adjacent vertically focusing mirror elements 4. Using a direct imaging detector 5c without a vertically focusing mirror element 4 enables that a part of the spectrum is imaged directly onto the detector 5. The embodiment 3 of FIG. 4 also uses vertically focusing mirror elements 4 with different radii of curvature ρ for the curved surfaces 8. The-vertically focusing element 4b has an infinite radius of curvature ρ, such that the curved surface 8 appears planar. Whereas the vertically focusing element 4a has a smaller radius of curvature ρ than the vertically focusing element 4b, such that the curved surface 8 appears cylindrical. The difference of the radii of curvature ρ of the light focusing elements 4a, 4b means that vertical focusing is achieved effectively with focusing mirror element 4a whereas mirror element 4b doesn't do any focusing at all. In order to use the same base plates for both detector units the angles of deflection are chosen to be the same, namely φ=90° in this example.

FIG. 5 shows an out of plane deflection and mirror-detector-setup in the different approaches for spatial arrangements of mirror-detector-setups (a) according to the state of the art, and (b) according to the present invention. FIG. 5a shows an optical system is according to the state of the art as disclosed in FR2953017B1, where a deflection angle of φ=+90° is used for both rows of mirror-detector-setups (front and back row mirrors) arranged along two polygon graphs widely offset against each other. Here, the mirror elements 10s have a larger distance to each other in order to deflect the incident light L from the dispersion plane DP towards the detectors 11s as deflected light LD. With a smaller distance the detectors 11s for back row and front row mirrors 10s or their mounts would collide. In order to match the long distance between front row mirror 10s and detector 11s, the vertical curvature of the mirror element 10s is adapted. Nevertheless, the position of the front row mirror elements 10s far away from the focal curve leads to a larger area of the spectral line at the off-focus position of the front row mirror 10s resulting in overlapping effects between neighboured mirrors of the front row and the back row resulting in part of light close to the edge of the mirror 10s will not be reflected by the dedicated front row mirror, but unintentionally penetrates to the back row mirror 10s. FIG. 5b shows the optical system 1 according to the present invention featuring minimized transition zones at the edge of the front row mirror elements 4, 4b. Deflection mirrors used at the light pickup are cylindrical in both approaches in order to provide vertically focusing mirror elements 4, 4a, 4b. The distance $d_{1,2}$ of the mirror axis to the focal curve FC is calculated according to formula (1) when inserting deflection angles $\varphi_{1,2}$ (see FIG. 7 for more details). When using an angle of deflection $\varphi_1$ less than 90°, the distance $\Delta=d_1-d_2$ between both mirrors is much less compared to FIG. 5a resulting in a shorter distance $d_1$ between front row mirror element 4, 4b to the corresponding detector 5, 5b providing on one hand a smaller height of the optical system 1 (the detector position according to the state of the art as shown in FIG. 5a is added to FIG. 5b as dashed lines for a better comparison). On the other hand, the closer distance $d_1$ to the focal curve FC leads to minimized transition zones at the edge of the front row mirror elements 4, 4b. The angle of deflection $\varphi_2$ for the back row mirror element 4, 4a of 90° is just an example and can be different for other embodiments.

Figure 6:
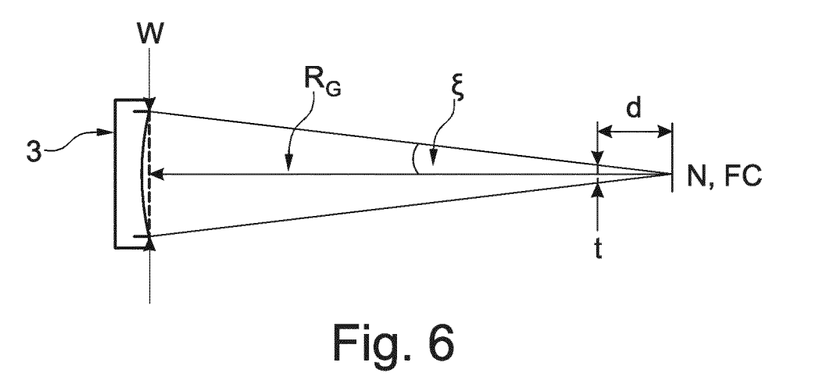
FIG. 6 minimum line width of a spectral line at a distance from the focal curve.

FIG. 6 shows the minimum line width t of a spectral line at a distance d from the focal curve. Here, a Rowland-grating has a radius of curvature (ROC) $R_G$ and an illuminated area on the grating 3 having the width W employs a light pickup around the normal point N, which is also the focal point lying on the focal curve FC of the normal wavelength λ at β=0°. The angle ξ corresponds to the half illumination angle of the grating. The width t of the spectral line at β=0° at a distance d from the focal point N is determined by the formulae:

$$t = 2d \tan \xi \quad (2)$$

where $$\sin \xi = W/2R_G \quad (3)$$

Figure 7:
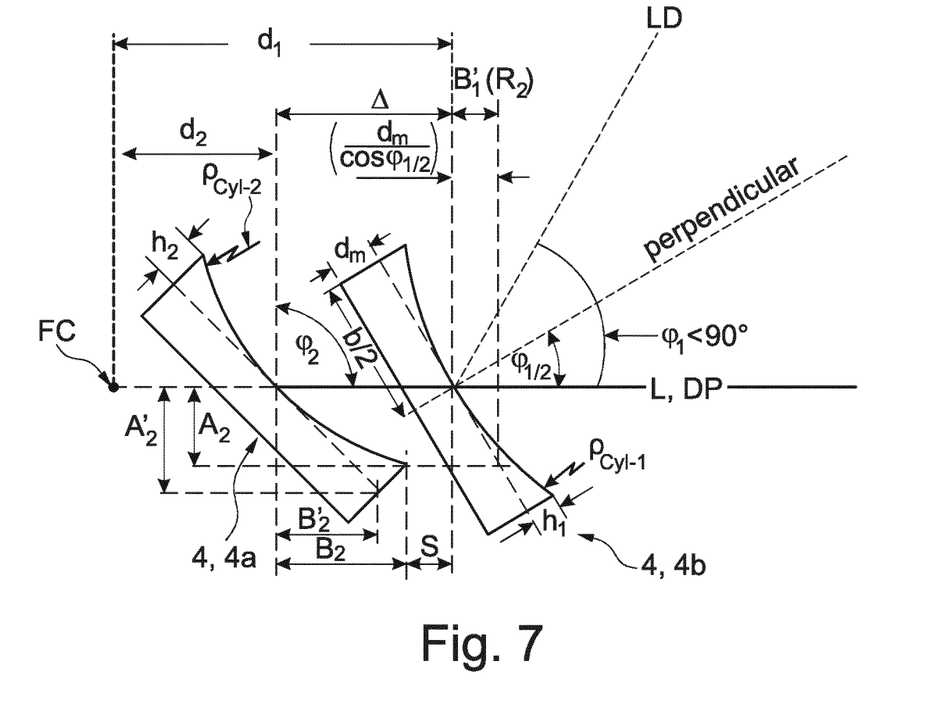
FIG. 7: section perpendicular to the plane of dispersion at the normal point to determine favorable geometry for achieving minimum safety distance s between two mirrors yielding the smallest width of the transition zone wT.

FIG. 7 shows a section perpendicular to the plane of dispersion at the normal point to determine favorable geometry for achieving minimum safety distance S between two vertically focusing mirror element mirrors 4, 4a, 4b, one of the front row and the other of the back row, yielding the smallest width of the transition zone of a spectral line illuminating both vertically focusing mirror elements 4a, 4b. The following formulae can be derived from FIG. 7:

$$h_{1,2} = \rho_{cyl\text{-}1,2}(1-\cos(\arcsin(b/2\rho_{cyl\text{-}1,2}))) \quad (4)$$

$$A'_{1,2} = b/2 \cos(\varphi_{1,2}/2) \quad (5)$$

$$B'_{1,2} = b/2 \sin(\varphi_{1,2}/2) \quad (6)$$

$$\Delta = d_1 - d_2 \quad (7)$$

$$A_{1,2} = A'_{1,2} - h_{1,2} \sin(\varphi_{1,2}/2) \quad (8)$$

$$B_{1,2} = B'_{1,2} + h_{1,2} \cos(\varphi_{1,2}/2) \quad (9)$$

$$B'_1(A_2) = (A_2/\cos(\varphi_1/2)) \sin(\varphi_1/2) = A_2 \tan(\varphi_1/2) \quad (10)$$

$$S = \Delta + B'_1(A_2) - dm/\cos(\varphi_1/2) - B_2 \quad (11)$$

where dm denotes the center thickness of the mirror element and b the height of the mirror element. To execute further deliberations, one can estimate reasonable maximum mirror heights b. In spark OES, the distance between electrode tip and sample (=counter electrode) is generally between 2 mm and 5 mm. A coupling lens or an imaging coupling mirror or mirror setup will image the light from the generated plasma onto the entrance aperture, illuminating its full height of up to 5 mm. In a spectrometer optics, imaging errors of the diffraction grating 3 will cause the lines to (among other things) become longer than the height of the entrance slit. As a rule of thumb for Rowland circle gratings, a length of 7 mm on average can be assumed. To focus light from the entire length of the spectral line onto the sensor of the detector 5 using a cylindrical mirror at a φ=90° angle of deflection as realised in the back row mirror elements 4, 4a in the present invention, the cylindrical mirror height needs to be b=10 mm high (=7 mm/cos(45°)).

Only spectral lines falling entirely onto a vertically focusing mirror element 4, 4a, 4b are considered useable which makes the width of the transition zone WT between adjacent mirrors:

$$WT = 2 \ t(\beta) \quad (12)$$

Since the widths of the transition zones WT in both approaches (state of the art and present invention according to FIGS. 5a and 5b) are determined solely by $d_1$, the distance of the front row mirrors (lying closest to the diffraction grating) to the focal curve FC. Assuming the same radius of curvature $\rho_{cyl\text{-}2}$ for the back row mirror elements 4, 4a, 10s in approaches according to FIGS. 5a and 5b, the task is the minimisation of $\Delta$, the distance between the two polygon graphs 6a, 6b for both approaches. Here, we will set the safety distance s at the closest proximity between front and back row mirror elements 4, 4a, 4b to S=1 mm to find appropriate values for $\rho_{cyl\text{-}1}$, $\varphi_1$ and $\varphi_2$. Assuming dm=2.2 mm and b=10 mm and taking the values of dm and b for both front and back row mirror elements 4, 4a, 4b and further assuming $R_G$=400 mm and W=40 mm making sin $\xi$=0.05 (formulae 2+3), one will obtain for the setups as shown in FIG. 5a (state of the art optical system 1s) and 5b (present invention optical system 1):

| | | |
|---|---|---|
| Optical system 1s: | $\rho_{cyl\text{-}1}$ = 75 mm, $\rho_{cyl\text{-}2}$ = 27.5 mm | $\varphi_1 = \varphi_2 = 90°$ |
| Optical system 1: | $\rho_{cyl\text{-}1}$ = 35 mm, $\rho_{cyl\text{-}2}$ = 27.5 mm | $\varphi_1 = 60°, \varphi_2 = 90°$ |

Using those values yields the following results for the widths of the transition zones WT for the approaches in FIG. 5a (state of the art optical system 1s) and FIG. 5b (present invention optical system 1) at the normal point N:

| | | |
|---|---|---|
| Optical system 1s: | $d_1$ = 26.517 mm and $d_2$ = 9.723 mm | WT = 2.6517 mm |
| Optical system 1: | $d_1$ = 15.155 mm and $d_2$ = 9.723 mm | WT = 1.5155 mm |

The smaller transition zone WT for the optical system 1 compared to the larger transition zone WT for the optical system 1s shows the improved performance of the optical system 1 according to the present invention.

Figure 8:
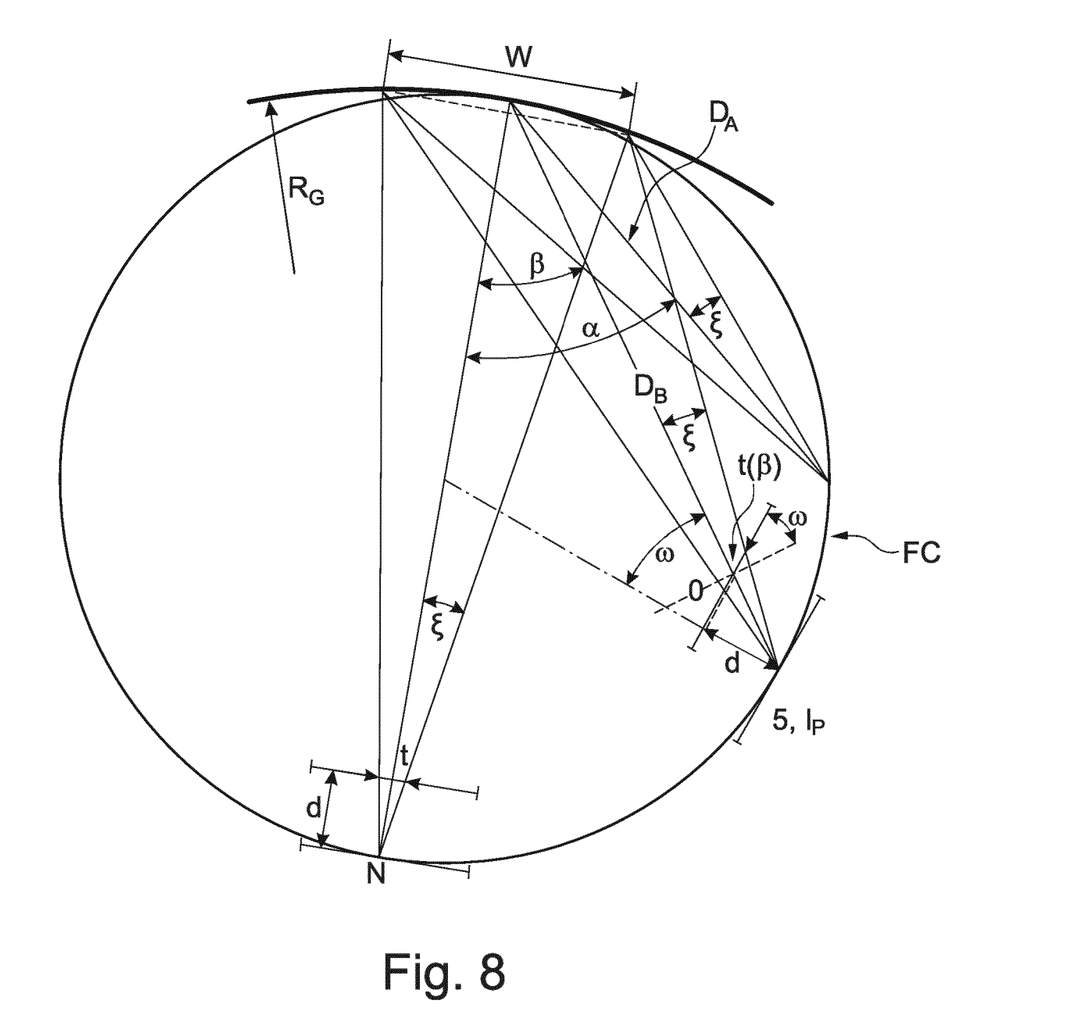
FIG. 8 schematic view of light paths and angles for the optical system according to the present invention as a Rowland circle optic.

FIG. 8 shows a schematic view of light paths and angles for the optical system according to the present invention as a Rowland circle optic, where $\beta$ denotes the occurring angles of diffraction, $\alpha$ the angle of incidence, $\omega$ the angle of incidence of the middle beam onto the focusing mirror element relative to the perpendicular, O the offset increasing with $\beta$, t the linewidth at distance d increasing with $\beta$, N the normal point, W the illuminated grating width, RG the radius of curvature of the grating and the determination of $\xi$. From FIG. 8 we see that although distance d and angle $\xi$ stay constant along the course of the focal curve (in this case the Rowland circle) for angles of diffraction $\beta$>0°, the length of the light path from the axis of the cylindrical mirror element 4, 4a, 4b to the pixel band $l_p$ of the detector 5, 5a, 5b increases with increasing $\beta$ according to the formula:

$$l_p = d/\cos \omega \quad (13)$$

and center points of the axis of the cylindrical mirror and the pixel band are offset against each other by offset O:

$$O = d \tan \omega \quad (14)$$

To calculate the width $t(\beta)$ of a spectral line for $\beta$ other than 0 on the mirror surface, d must be replaced by $(l_p/\cos \omega)$ in formula (2) yielding:

$$t(\beta) = 2d \tan \xi / \cos^2 \omega \quad (15)$$

where $\omega$ is specific to and dependent on the course of the focal curve FC. For a Rowland circle optics $\omega = \beta$ applies.

For determining angles of diffraction and focal points on the focal curve the grating equation:

$$n\, G\lambda = \sin \alpha + \sin \beta \quad (16)$$

and the back-focus equation:

$$\frac{\cos^2 \alpha}{L_A} - \frac{\cos \alpha}{R} + \frac{\cos^2 \beta}{L_B} - \frac{\cos \beta}{R} - \frac{n\lambda}{\lambda_0} C_f = 0 \quad (17)$$

with: n order of diffraction
G grating constant (number of grooves per mm @ grating centre)
$\lambda$ diffracted wavelength
$\alpha$ angle of incidence
$\beta$ angle of diffraction
$L_A$ distance between the entrance aperture and grating centre
$L_B$ distance between the focal point of the diffracted $\lambda$ and the grating centre
R radius of curvature of the grating substrate
$\lambda_0$ exposure wavelength used during grating manufacturing
$C_f$ flat field constant;
are used; if $C_f$=0, all elements comprising an optical system are located on a circle called the Rowland circle.

The vertically focusing mirror elements of the embodiments shown in the FIG. 1 to FIG. 8 are mostly described as cylindrical mirrors, but it is also possible to have mirror elements with a curved surface 8 that have an infinite radius of curvature $\rho$ and thus are planar or a curved surface 8 that comprises several radii of curvature $\rho$ forming a conical surface. Therefore, flat, cylindrical or conical mirrors can be used. It is especially beneficial if a combination thereof is used in the optical system 1. Focusing lenses, like rod lenses or cylindrical lenses, can be used in all embodiments described above e.g. in combination with flat deflection mirrors instead of vertically focusing mirror elements as vertically focusing elements 4.

The setup of the optical system 1 in a Paschen-Runge-Setup as described above is not intended to be restrictive, rather the embodiments of the FIG. 1 to FIG. 8 of the optical system 1 are also suitable for a Flat-Field-Setup or a Czerny-Turner-Setup or an Ebert-Fastie-Setup.

Furthermore, the detectors 5, as well as the direct imaging detectors 5c, in all embodiments described above are line detectors, such as CCD or CMOS detectors.

At least one of the optical systems 1 described above and an operating unit can be used in a spectrometer device, which is not described further. Thereby the operating unit is connected to at least the detector arrangement of at least two detectors 5 in order to operate these at least two detectors 5 and to analyze the measured spectrum of the light L.

The embodiments shown here are only examples of the present invention and must therefore not be understood as restrictive. Alternative embodiments considered by the skilled person are equally covered by the scope of protection of the present invention.

LIST OF REFERENCE NUMERALS

1 optical system according to the present invention
1s optical system according to the state of the art
2 entrance aperture
3 grating
4, 4a, 4b vertically focusing mirror elements (present invention)
5, 5a, 5b detectors (present invention)
5c direct imaging detectors 6, 6a, 6b polygon graphs, segments are parallel to local tangents to the focal curve behind the mirror elements
7a, 7b adjacent ends of the vertically focusing elements
8 curved surface
9 base plate
10s vertically focusing mirror elements (present invention)
11s detectors according to the state of the art
100 spectrometer device
α angle of incidence
β angle of diffraction
φ angle of deflection
$\varphi_1$ angle of deflection of from row vertically focusing mirror element 4b
$\varphi_2$ angle of deflection of back row vertically focusing mirror element 4a
ξ angle given by: $\sin \xi = W/2\, R_G$
ω angle of incidence of middle beam onto vertically focusing mirror element relative to the perpendicular
A longitudinal axis
$A'_{1,2}$ distance given by: $A'_{1,2} = b/2 \cos(\varphi_{1,2}/2)$
$A_{1,2}$ distance given by: $A_{1,2} = A'_{1,2} - h_{1,2} \sin(\varphi_{1,2}/2)$
$B'_{1,2}$ distance given by: $B'_{1,2} = b/2 \sin(\varphi_{1,2}/2)$
$B_{1,2}$ distance given by: $B_{1,2} = B'_{1,2} + h_{1,2} \cos(\varphi_{1,2}/2)$
$B'_1(A_2)$ distance given by: $B'_1(A_2) = (A_2/\cos(\varphi_1/2)) \sin(\varphi_1/2) = A_2 \tan(\varphi_1/2)$
b length (height) of the vertically focusing mirror element 4 perpendicular to axis A as shown in FIG. 3.
d distance from the focal curve according to formula (1)
$d_1$ distance between the focal curve and the axis of the deflecting surface of the vertically focusing front row mirror
$d_2$ distance between the focal curve and the axis of the deflecting surface of the vertically focusing back row mirror
Δ is the difference between $d_1$ and $d_2$, where said difference corresponds to the distance between the two polygon graphs 6a, 6b
Δs distance between back row vertical focusing elements and front row vertical focusing elements in the deflection plane for the optical system according to state of the art
$D_A$ distance between the entrance aperture and the grating center
$D_B$ distance between the focal point of the diffracted wavelength λ(β) and the grating center
DP dispersion plane
dm center thickness of the vertically focusing mirror element
FC focal curve
$h_{1,2}$ height of the curvature of the vertically focusing mirror elements given by: $h_{1,2} = \rho_{cyl-1,2}(1-\cos(\arcsin(b/2\rho_{cyl-1,2})))$
Ip pixel band of the detector
L light from the sample
LD deflected light
N normal point, focal point of normal wavelength for β=0
O offset between the center points of the axis of the cylindrical mirror and the pixel band of the detector
$\rho_{Cyl}$ radius of curvature of the curved surface 8
$\rho_{Cyl-1}$ radius of curvature of the curved surface 8 of front row vertically focusing mirror element 4b
$\rho_{Cyl-2}$ radius of curvature of the curved surface 8 of back row vertically focusing mirror element 4a
$R_G$ radius of curvature of the grating 3
S safety distance given by: $s = A + B'_1(A_2) - dm/\cos(\varphi_1/2) - B_2$
t line width at a distance d from the focal curve
W illuminated width of the granting 3
X horizontal axis
Y axis perpendicular to X-axis and Z-axis
Z vertical axis

The invention claimed is:

1. An optical system comprising:
at least one entrance aperture for entering light to be analyzed,
at least one diffraction grating for spectral dispersion of the light,
at least two detectors to measure a spectrum of the light, where the detectors are arranged on a same side of a plane of dispersion of the optical system, and
at least two vertically focusing mirror elements for focusing the light onto said detectors assigned to said vertically focusing mirror elements, characterized in that
the vertically focusing mirror elements are arranged as front row mirror elements and back row mirror elements along two polygon graphs offset to each other and to a focal curve, where each section of the polygon graph is parallel to its dedicated local tangent to the focal curve of the grating, such that
angles of deflection for the front row mirror elements are <90° allowing to minimize the offset of the front row mirror elements to the focal curve,
distances between said front row mirror elements and corresponding detectors assigned to said front row mirror elements is minimized while still avoiding collisions between the corresponding detectors and their mounts with back row detectors and their mounts, and
at least one end of said front row mirror element is overlapping adjacent back row mirror element or a receptive area of an adjacent direct light detector if regarded from the grating.

2. The optical system according to claim 1, wherein a shape of reflecting surfaces of at least one of said vertically focusing mirror elements is a segment of a cone.

3. The optical system according to claim 1, wherein a shape of reflecting surfaces of at least one of said vertically focusing minor elements is a cylinder.

4. The optical system according to claim 1, wherein at least one of the vertically focusing mirror elements a flat mirror element deflecting the light onto one of said detectors which is assigned to said flat mirror element.

5. The optical system according to claim 1, wherein an absolute values of the angles of deflection of at least two vertically focusing mirror elements are different.

6. The optical system according to claim 1, wherein an averaged or constant—radii of curvature of at least two vertically focusing mirror elements are different.

7. The optical system according to claim 1, wherein at least two vertically focusing mirror elements having different absolute values of the angles of deflection have same averaged or constant—radius of curvature.

8. The optical system according to claim 1, wherein at least one detector does not have a vertically focusing mirror element being assigned to it, the detector thus being positioned along a segment of an original focal curve of the grating so that a part of the spectrum is being imaged directly onto said detector.

9. The optical system according to claim 1, wherein at least one detector is equipped with a lens for vertical focusing.

10. The optical system according to claim 1, wherein a building principle of the optical system is a Paschen-Runge setup or a flat-field setup or a Czemy-Tumer setup or an Ebert-Fastie setup.

11. The optical system according to claim 1, wherein the detectors are line detectors, preferably CCD or CMOS detectors.

12. A spectrometer device comprising at least one optical system according to claim 1, further comprising an operating unit connected to at least the detectors to operate said detectors and to analyze the measured spectrum of the light.

\* \* \* \* \*